United States Patent [19]

Kawa

[11] 3,786,360

[45] Jan. 15, 1974

[54] SYSTEM FOR DEMODULATING PULSE-NUMBER-MODULATED BINARY SIGNALS

[75] Inventor: Ryuichi Kawa, Yokohama, Japan

[73] Assignee: Ricoh Co., Ltd., Tokyo, Japan

[22] Filed: Dec. 14, 1972

[21] Appl. No.: 315,210

Related U.S. Application Data

[63] Continuation of Ser. No. 213,332, Dec. 29, 1971, abandoned.

[30] Foreign Application Priority Data

Dec. 31, 1970 Japan .............................. 45-123405

[52] U.S. Cl. ................. 329/104, 307/233, 307/246, 328/109, 328/151, 325/321, 178/88

[51] Int. Cl. ............................................ H03k 9/06

[58] Field of Search ..................... 329/104; 307/233, 307/236, 246; 328/109, 151; 325/320, 321, 322, 324; 178/66 A, 88

[56] References Cited

UNITED STATES PATENTS

| | | | |
|---|---|---|---|
| 3,320,434 | 5/1967 | Ott | 329/104 X |
| 3,408,581 | 10/1968 | Wakamoto et al. | 307/233 X |
| 3,473,131 | 10/1969 | Perkins | 307/236 X |
| 3,701,909 | 10/1972 | Holmes et al. | 307/246 |

*Primary Examiner*—Alfred L. Brody
*Attorney*—Henry T. Burke et al.

[57] ABSTRACT

A demodulation system is provided in which the pulse-number-modulated binary signals for example "1" and "0" which are represented by the existence and absence of a predetermined number of successive pulses, respectively, are demodulated by use of the charging and discharge of a capacitor. When one of the pulse-number-modulated binary signals, for example "1," is demodulated, the discharge of the charged capacitor is made slower than that of the prior art system, whereas the discharge of the capacitor is made at the high speed when the other pulse-number-modulated binary signal, for example, "0" is demodulated.

11 Claims, 8 Drawing Figures

INVENTOR.
RYUICHI KAWA
BY Henry T. Burke
ATTORNEY

INVENTOR.
RYUICHI KAWA
BY
Henry T. Burke
ATTORNEY

INVENTOR.
RYUICHI KAWA
BY Henry T. Burke
ATTORNEY

INVENTOR.
RYUICHI KAWA
BY Henry T. Burke
ATTORNEY

SYSTEM FOR DEMODULATING PULSE-NUMBER-MODULATED BINARY SIGNALS

This is a continuation, of application Ser. No. 213,332 filed 12/29/71, now abandoned.

BACKGROUND OF THE INVENTION

The present invention relates to generally a pulse-number-modulated signal demodulation system, and more particularly a system in which the binary signals which are represented by the existence and absence of a predetermined number of successive pulses are demodulated into the binary signals.

There has been known a binary coded digital information transmission system in which one binary signal for example "1" is represented by the existence of a predetermined number of sucessive pulses whereas the other binary signal, for example, "0," is represented by the absence of said successive pulses. In the prior art pulse-number-modulated signal demodulation system, the input pulses train are applied to a charging circuit and a discharge circuit through an inverter. A capacitor connected to both the charging and discharge circuits, is charged through the charging circuit when the first input pulse arrives, to a predetermined level, and is discharged through the discharge circuit when the first pulse disappears, to a predetermined level. The above charging and discharge of the capacitor are cycled as each pulse arrives and disappears. When a predetermined number of pulses are received in succession, the voltage across the capacitor is raised to a predetermined threshold level, at which a flip-flop is set to "1." Thus, the signal represented by predetermined number of pulses is demodulated into the binary signal "1."When no pulse arrives for a predetermined time after the output signal "1" is derived, the capacitor is gradually decreased so that the voltage across it is lowered to a predetermined section threshold level, at which the flip-flop is reset to "0." Thus, the signal represented by absence of input pulses for a predetermined time interval can be demodulated as "0. "

One of the advantages of the prior art demodulation system of the type described is that its circuit is very simple in construction. However, the prior art demodulation system has a defect that it tends to malfunction of demodulating binary signal when some of a predetermined number of pulses are missing and noise pulses are received. That is, when some of a predetermined number of pulses representing one binary signal "1" are missing, the voltage across the capacitor is not raised to a predetermined threshold level so that the flip-flop remains reset. As a consequence, the output signal "0" is derived, whereas the output signal "1" should be derived. When a noise signal is received during a predetermined time in which said predetermined number of pulses should be absent, the voltage across the capacitor is not lowered to a predetermined threshold level so that the flip-flop remains set to "1." Thus, the error output signal "1" is derived whereas the correct output signal is "0."

One of the objects of the present invention is therefore to provide an improved pulse-number-modulated signal demodulation system which can generate the correct output signals even when some of a predetermined number of pulses are missing and a noise pulse is received during a predetermined time in which no pulse should be received.

Briefly stated, according to the present invention, a capacitor is charged through a charging circuit when an input pulse is being received, and is discharged through a discharge circuit when the pulse disappears, as in the case of the prior art system, whereby the pulse-number-modulated signals are demodulated in the manner described above. The present invention further provides a second discharge circuit so that the capacitor may be discharged through only one of the two discharge circuits to make it slow to discharge the capacitor when the pulse-number-modulated signal representing for example "1" is received. On the other hand, the both discharge circuits are activated to discharge the capacitor at high speed when the pulse-number-modulated signal representing "0" is received. Therefore, even if some of the pulses in the signal representing "1" are missing, the voltage across the capacitor can be positively raised to a threshold level, at which the flip-flop is set to "1." Thus, the pulse-number-modulated signal is demodulated. Even when a noise pulse is received during a predetermined time interval in which the pulses should be absent or not received, the two discharge circuits are simultaneously activated to discharge the capacitor at high speed to a predetermined threshold level, at which the flip-flop is reset to "0." Thus, the pulse-number-modulated signal representing "0" is demodulated.

The above and other objects, features and advantages of the present invention will become more apparent from the following description of the preferred embodiment thereof taken in conjunction with the accompanying drawing and in comparison with the prior art demodulation system.

Figure 1:
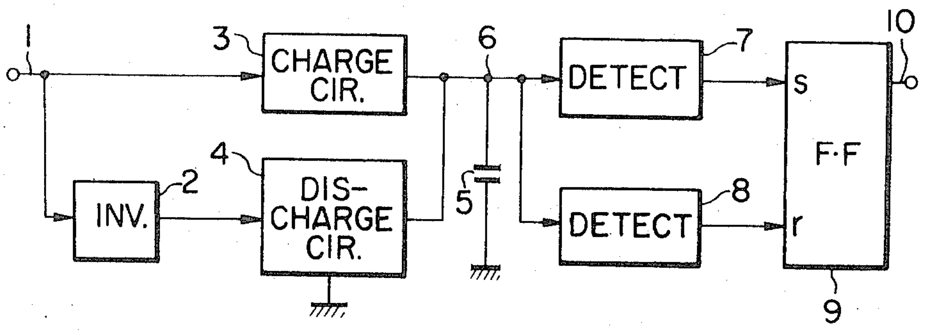
FIG. 1 PRIOR ART
FIG. 1 is a block diagram of the prior art demodulation system.
Figure 2:
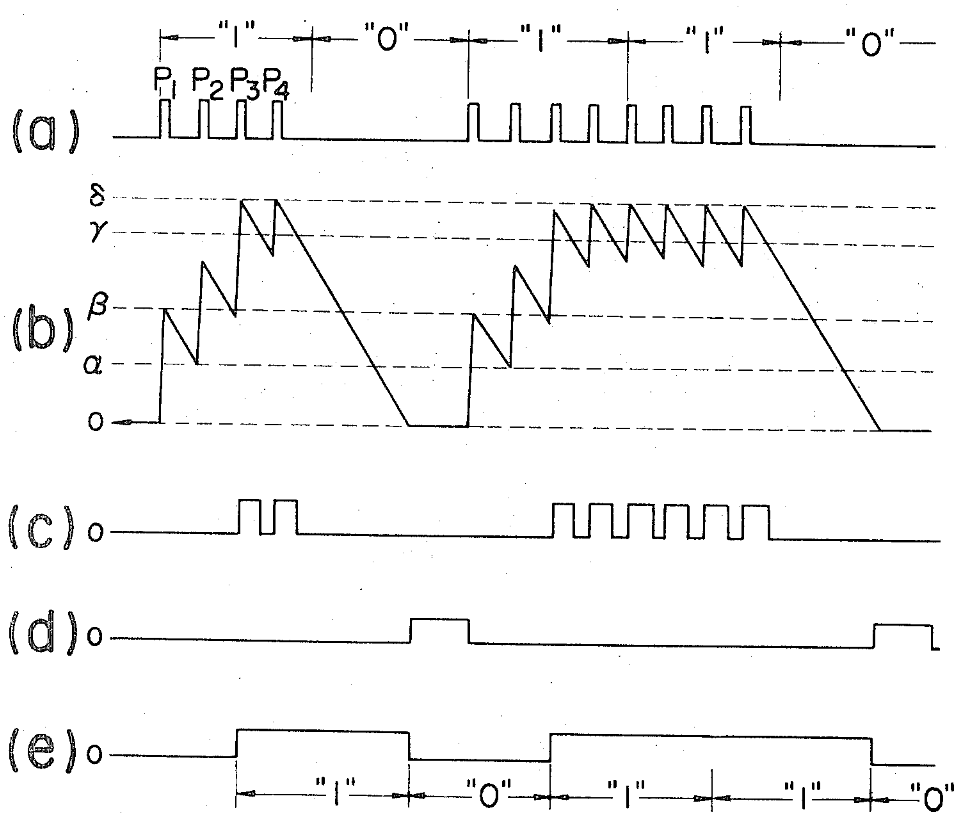
FIG. 2 PRIOR ART
FIGS. 2 and 3 are diagrams of input pulse and out signal waveforms used for explanation of the normal mode of operation and the malfunction thereof.

DESCRIPTION OF THE PREFERRED EMBODIMENT:

Referring to FIGS. 1–3, in order to more specifically point out the problems of the prior art demodulation systems, an example thereof will be briefly described prior to the description of the preferred embodiment. First referring to FIG. 2(*a*), the "1" signal represents that four pulses are received in succession, whereas the "0" signal represents that there exists no pulse; that is, the zero level continues. Next referring to FIG. 1, when a pulse train is received at an input terminal 1, it is directly fed to a charging circuit 3, and is also fed to an inverter 2 wherein the voltage level of the pulse train are inverted. The outputs of the inverter 2 are applied to a discharge circuit 4. The charging and discharge circuits 3 and 4 are activated only when the positive polarity or high voltage level signals are applied to them, and the charging time constant of the circuit 3 is shorter than that of the circuit 4.

When the first pulse $p_1$ of the four pulses representing "1" as shown in FIG.2(*a*) arrives, the charging circuit 3 is activated to charge a capacitor 5. As a result, the voltage across the capacitor 5 is raised to the level $\beta$ as shown in FIG.2(*b*). When the first pulse $p_1$ disappears, the discharge circuit 4 is activated, and remains discharging the capacitor 5 until the next pulse $P_2$ arrives. As a result, the voltage at a point 6 is lowered to the level $\alpha$ as shown in FIG. 2(*b*). In like manner, the charging circuit 3 and the discharge circuit 4 are activated and deactivated, and when the third pulse $p_3$ arrives, the voltage at the point 6 reaches to a level higher than the level $\gamma$, at which the threshold level of a threshold voltage detector 7 is activated. When the voltage at the point 6 is raised higher than the level $\gamma$, a signal is derived from the detector 7 as shown in FIG. 2(*c*), and is applied to a set terminal of a flip-flop 9 so that the latter is set, thereby transmitting a signal from its output terminal 10 as shown in FIG.2(*e*). When the voltage at the point 6 reaches the level $\delta$, the charging of the capacitor 5 is stopped so that even when the fourth pulse $P_4$ arrives at the input terminal 1, the voltage at the point 6 remains unchanged.

When no pulse train is applied to the input terminal 1, the capacitor 5 is discharged through the discharge circuit 4, and the voltage across it reaches the zero level as shown in FIG. 2(*b*), at which a second threshold voltage detector 8 is activated. As a result, a signal is derived from the detector 8 as shown in FIG. 2(*d*), and is applied to a reset terminal of the flip-flop 9, whereby the latter is reset. As a consequence the output at the output terminal 10 becomes zero. (See FIG. 2(*e*)).

Figure 3A:
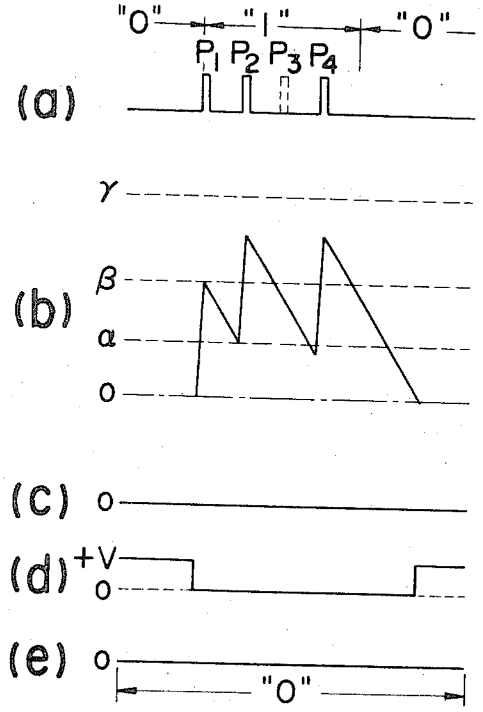
FIG. 3(A) PRIOR ART
Figure 3B:
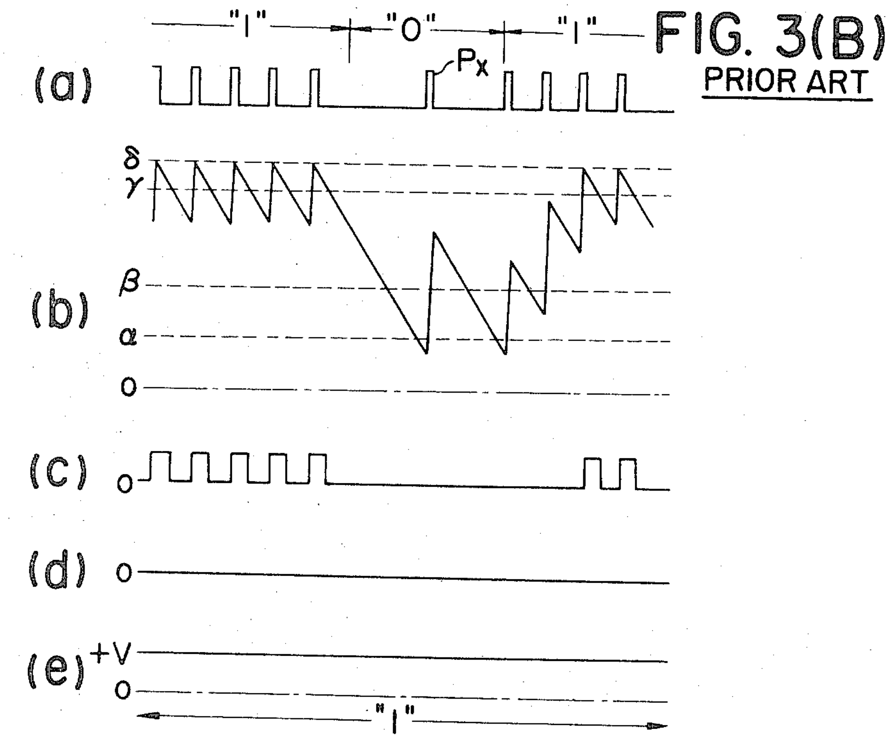
FIG. 3(B) PRIOR ART

The pulse trains are detected in the manner described above, and the output signals "1" or "0" are derived from the output terminal 10. However, when some of the pulses in the pulse trains are missing, the signal "0" appears at the output terminal 10 instead of the correct output signal "1." On the other hand, the "1" signal appears at the output terminal 10 instead of the correct output signal "0" if the noise pulse appears at the input terminal 1 even when no pulse train be applied thereto. The above malfunctions will be further described in more detail with reference to FIG. 3. When the third pulse $p_3$ is missing in the pulse train of four pulses as shown in FIG. 3(A), the voltage across the capacitor 5 will not reach the threshold level $\gamma$ so that the flip-flop 9 remains reset (See Fig. 3(A)–(*d*)). As a result, the output signal of the output terminal 10 is "0" as shown in FIG. 3(A)–(*e*). On the other hand, if the noise pulse $p_x$ arrives at the input terminal 1 as shown in FIG. 3(B) even when no pulse train be applied thereto, the voltage across the capacitor 5 is raised so that it fails to return to the zero level completely as shown in FIG. 3(B)–(*b*). As a result, the flip-flop 9 is not reset (See FIG.3(B)–(*d*)), and the output signal at the output 10 remains "1." The present invention was made to overcome the aforementioned defects of the prior art demodulation system.

The Invention

Figure 4:
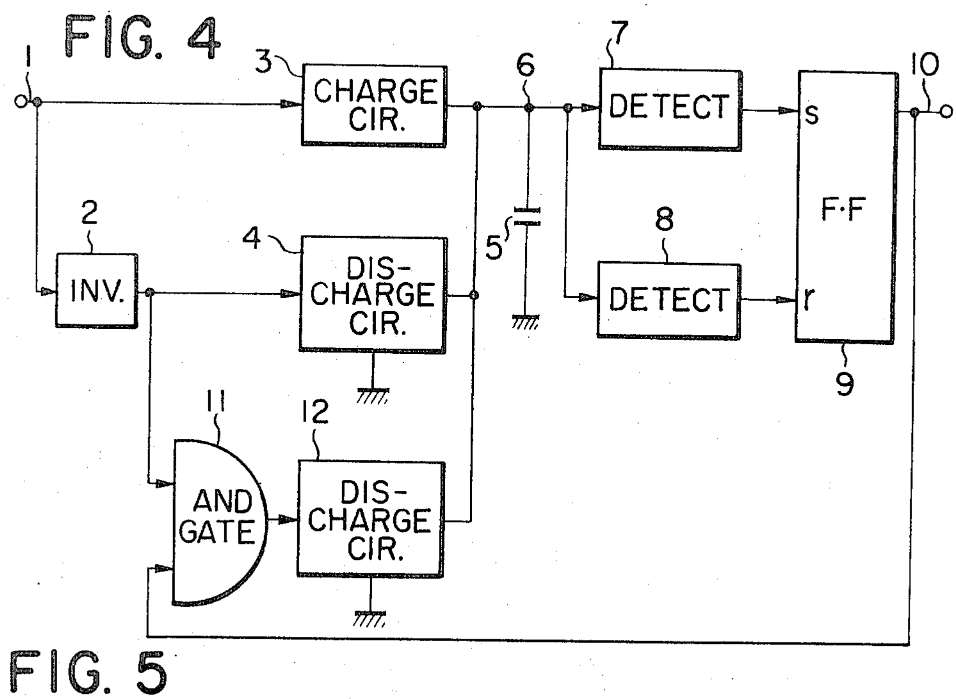
FIG. 4 is a block diagram of a pulse-number-modulated signal demodulation system in accordance with the present invention.

Referring to FIG. 4, same reference numerals are used to designate same parts described with reference to FIG. 1. The demodulation system in accordance with the present invention shown in FIG. 4 further comprises an AND gate 11, and a discharge circuit 12. The AND gate 11 is adapted to output an AND signal when the signal "1" from the output terminal 10 and the high voltage level signal from the inverter 2 are applied simultaneously to the AND gate 11, and the discharge circuit 12 is activated in response to the output from the AND gate 11. The charging current of the charging circuit 3 is set to a magnitude slightly smaller than that of the changing circuit shown in FIG. 1. Similarly the discharge current of the discharge circuit 4 is set to a small value for example about one fifth of that of the discharge circuit 4 shown in FIG. 1. However, it should be noted that the total discharge current of the discharge circuits 4 and 12 is so selected as to be higher than that of the prior art discharge circuit 4 in FIG. 1.

Figure 5:
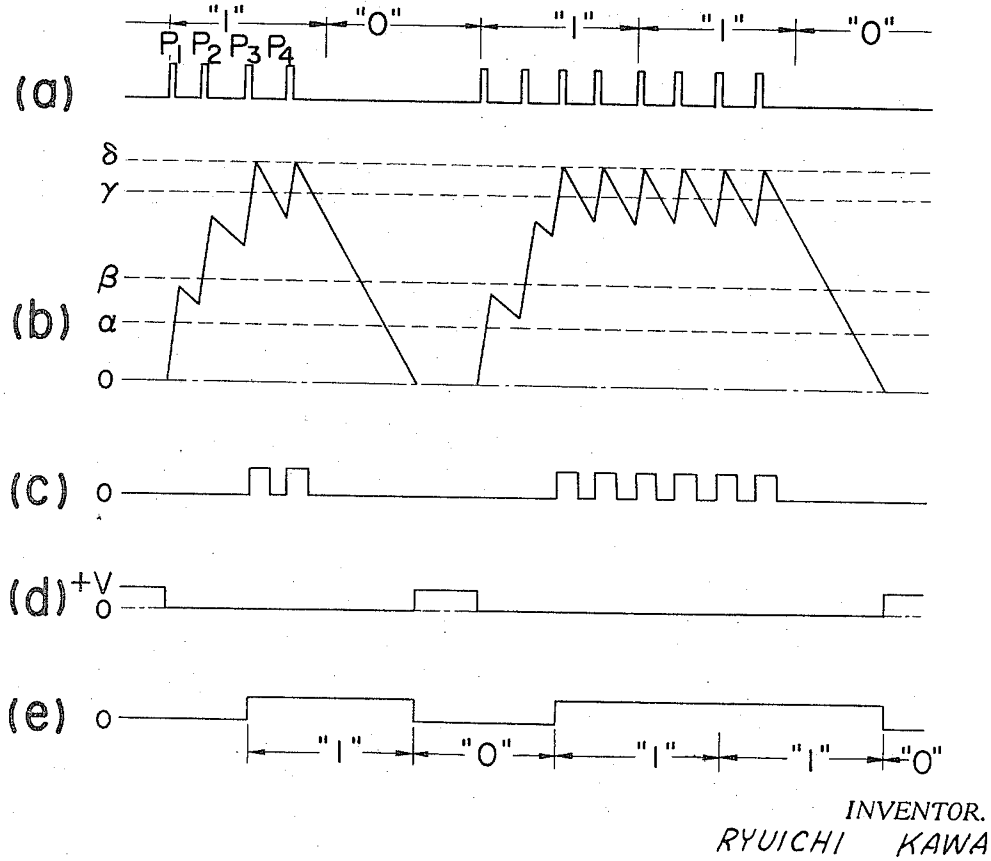

The mode of operation of the demodulation system in accordance with the present invention is substantially similar to that of the prior art system described hereinbefore with reference to FIGS. 1–3 unless some of the pulses in the pulse trains are not missing or noise pulse is received when there should be no pulse. The mode of operation of the system of the present invention is illustrated in FIG. 5, wherein the signals "1"s are derived when the pulse trains of each consisting of four positive polarity pulses are applied to the input terminal 1, whereas the signal "0" is derived when no signal train is applied. That is, when the pulse train consisting of four pulses $p_1$–$p_4$ arrives at the input terminal 1 as shown in FIG. 5(a), the charging circuit 3 is activated to charge the capacitor 5 so long as the first pulse $p_1$ lasts. As a result, as shown in FIG. 5(*b*), the voltage across the capacitor 5, that is the voltage at the point 6 is raised to a level slightly lower than the level $\beta$, unlike the prior art system shown in FIG. 2(*b*). When the first pulse $P_1$ disappears, the discharge circuit 4 is activated to discharge the capacitor 5 so that the voltage across it is lowered to a level slightly higher than the level $\alpha$ as shown in FIG. 5(*b*). Similarly the charging and discharge circuits 3 and 4 are alternately activated, and the voltage at the point 6 reaches the level $\gamma$ so that the signal as shown in FIG. 5(*c*) is derived from the threshold voltage detector 7, and is applied to the flip-flop 9. As a result, the flip-flop 9 is set, and the signal "1" appears at the output terminal 10 as shown in FIG. 3(*e*).

When no pulse train is applied to the input terminal 1, the discharge circuit 4 is activated as in the case of the prior art system shown in FIG. 1, and the signals "1"s from the inverter 2 and the output terminal 10 are applied to the AND gate 11 so that the discharge circuit 12 is also activated. As a result, the capacitor 5 is discharged at a high speed, that is in a short time as compared with the prior art system wherein only one discharge circuit 4 inserted. The voltage at the point 6 reaches the zero level as shown in FIG.5(*b*), and the signal is derived from the detector 8, and is applied to the reset terminal of the flip-flop 9 as shown in FIG. 5(*d*). As a consequence, the flip-flop is reset, and the output signal "0" appears at the output terminal 10.

Figure 6A:
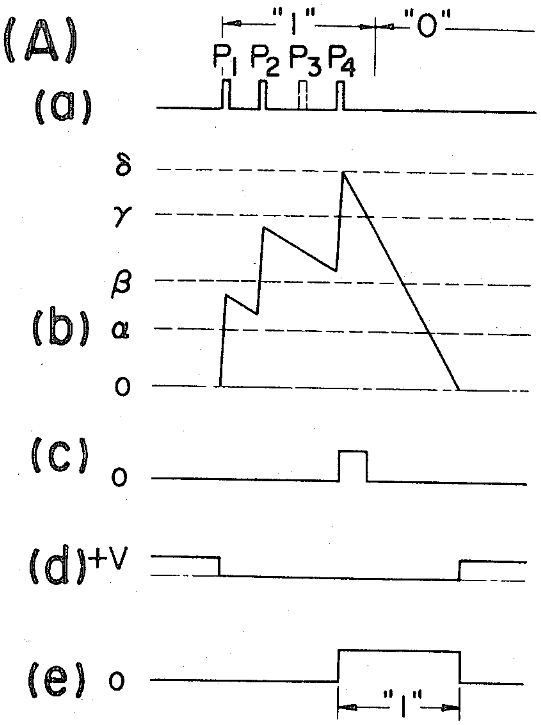
FIGS. 5 and 6 are diagrams similar to FIGS. 2 and 3, respectively, used for explanation of the mode of operation when the normal input signals are received and the modes of operation when some of the pulses in the input signals are missing and a noise signal is received.
Figure 6B:
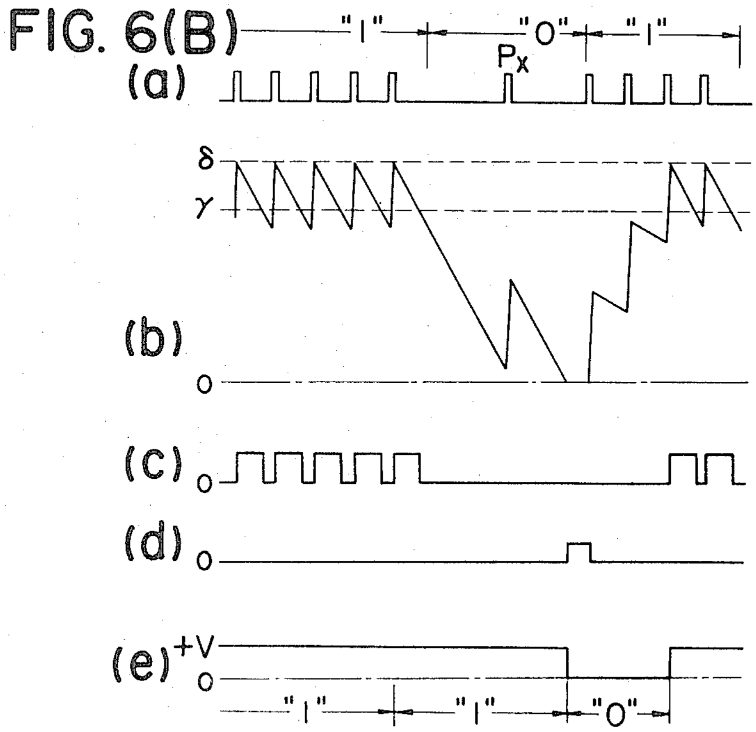

From the foregoing description, it is seen that according to the present invention the discharge current from the capacitor 5 is reduced so that the signal "1" or the four pulse train can be positively detected even when one of the pulses is missing, whereas the discharge current from the capacitor 5 is increased in order to eliminate the disturbance due to the noise pulse. This novel advantage of the present invention will be further described in more detail with reference to FIG. 6. In FIG. 6(A), the third pulse $P_3$ is shown as missing, whereas the noise pulse $P_x$ is inserted in FIG. 6(B) when no pulse train should not be applied to the input terminal. As described hereinbefore, the charges discharged from the capacitor 5 through the discharge circuit 4 are smaller than those of the capacitor 5 in the prior art system shown in FIG. 1 so that the voltage at the point 6 can be positively raised to the level $\gamma$ when the fourth pulse $P_4$ arrives even if the third pulse $p_3$ is missing. As a result, the signal as shown in FIG. 6(A-)-(*c*) is derived from the detector 7, and is applied to the flip-flop 9. Therefore, the flip-flop 9 is set, and the output signal "1" appears at the output terminal 10 as shown in FIG. 6(A)-(*e*). When no pulse train is applied to the input terminal, the capacutor 5 is rapidly discharged through the discharge circuit 4 and 12 so that even if the noise pulse is inserted as shown in FIG. 6(B), the voltage across the capacitor 5 can be positively lowered to the zero level. The signal as shown in FIG. 6(B)-(*d*) is derived from the detector 8, and is applied to the reset terminal of the flip-flop 9. As a result, the flip-flop 9 is reset, and the output signal 10 as shown in FIG. 6(B)-(*e*).

What is claimed is:

1. A system for demodulating pulse-number-modulated binary signals which are represented by the existence and absence of a predetermined number of successive pulses, characterized by comprising
   a capacitor,
   means for charging said capacitor when said pulses exist or are absent,
   first and second discharge means for discharging said charged capacitor when said pulses are absent or exist,
   voltage level detecting means adapted to detect the rise of the voltage across said capacitor to a first level to give an output of first signal, and also to detect the fall of the voltage across said capacitor to a second level from said first level to give an output of second signal, and
   output means adapted to output a signal representing one of said binary signals in response to said first signal from said detecting means and a signal representing the other binary signal in response to said second signal, said capacitor being discharged only through said first discharge means when the input signals representing one of said binary signals are received, but said capacitor being discharged through said second discharge means when the input signals representing said other binary signal.

2. The demodulating system as set forth in claim 1 charactrized in that during the reception a signal corresponding with the state of said other binary signal, said capacitor may be discharged by said first and second discharge means.

3. A demodulation system as set forth in claim 1 wherein said system further comprises AND gate means adapted to output an AND signal when the output signal representing said one binary signal and the input signal representing said other binary signal are simultaneously applied to said AND gate, said second discharge means being activated in response to said AND signal from said AND gate means.

4. Apparatus for demodulating pulse code modulated first and second binary signals represented respectively by the presence and absence of a predetermined number of successive pulses of a defined polarity, comprising:
   storage means and first means responsive to the presence of pulses for changing the contents of the storage means in a first defined direction only when said pulses are present;
   second and third means each responsive to the absence of pulses for changing the contents of the storage means in a second direction only when said pulses are absent, said second direction being opposite said first direction;
   means for detecting the contents of the storage means and for providing as an output a first signal when the contents of the storage means are above a first defined threshold, and for providing a second output signal when the contents of the storage means are below a second defined threshold;
   output means for providing an output signal representing said first binary signal in response to the provision of said first signal by the detecting means and for providing an output signal representing said second binary signal in response to the provision of said second signal by the detecting means; and
   means for disabling one of said second and third means and for thereby causing only one of said second and third changing means to change the contents of the storage means when a defined one of said first and second binary signals is provided by the output means, and for causing both said second and third changing means to change the contents of the storage means when the other one of said first and second binary signals is provided by the output means.

5. Apparatus as in claim 4 wherein the storage means comprises means for storing an analog voltage signal, and the first, second and third means for changing the contents of the storage means comprise means for changing the level of the voltage signal stored in said storage means.

6. Apparatus as in claim 5 wherein the storage means comprises a capacitor.

7. Apparatus as in claim 5 wherein the first means comprises means for increasing the level of the voltage signal stored in the storage means, and the second and third means comprise means for decreasing the level of the voltage signal stored in the storage means.

8. Apparatus as in claim 7 wherein the first binary signal provided by the output means represents a binary 1, and wherein the disabling means disables the third changing means when said first binary signal representing a binary 1 is provided by the output means.

9. Apparatus as in claim 8 wherein the disabling means comprises an AND-gate receiving as one of its inputs a signal representing the absence of said pulses, receiving as another of its inputs a signal representing said first binary signal provided by the output means, and providing an AND-gate output only when both inputs are present, said AND-gate output disabling the third changing means.

10. Apparatus as in claim 4 wherein said storage means comprises means for storing a voltage signal, the first changing means comprises means for increasing the level of said voltage signal, the second and third changing means comprise means for decreasing the level of said voltage signal, the detecting means comprise means for providing a first signal when the voltage signal in the storage means is above a first defined threshold and for providing a second signal when the voltage signal in the storage means is below a second defined threshold, the output means comprise means for providing an output representing said first binary signal in response to the presence of said signal provided by the detecting means and for providing said second binary signal in response to said second output signal from the detecting means, and the disabling means comprise means responsive to the concurrence of an absence of said pulses and to the provision of said first binary signal by the output means to disable the third changing means.

11. Apparatus for demodulating pulse code modulated first and second binary signals represented respectively by the presence and absence of a predetermined number of successive pulses of a defined polarity, comprising:

storage means and first means connected thereto and responsive to the presence of pulses for changing the contents of the storage means in a first direction only when said pulses are present;

second and third means each connected to the storage means and each responsive to the absence of pulses for changing the contents of the storage means in a second defined direction only when said pulses are absent, said second direction being opposite said first direction;

means for detecting the contents of the storage means and for providing as an output a first signal when the contents of the storage means are in a first defined range and for providing as an output a second signal when the contents of the storage means are in a second defined range;

output means for providing an output signal representing one of said first and second binary signal in response to the detecting means providing said first output signal and for providing an output signal representing the other one of said first and second binary signal in response to the detecting means providing its second output signal; and means for disabling the third changing means and for thereby causing only the second changing means to change the contents of the storage means when a defined one of said first and second binary signal is provided by the output means, and for causing both said second and third changing means to change the contents of the storage means when the other one of said first and second binary signal is provided by the output means.

* * * * *